(12) United States Patent
Persson et al.

(10) Patent No.: US 9,794,309 B2
(45) Date of Patent: Oct. 17, 2017

(54) METHOD AND A MEDIA DEVICE FOR PRE-BUFFERING MEDIA CONTENT STREAMED TO THE MEDIA DEVICE FROM A SERVER SYSTEM

(71) Applicant: SPOTIFY AB, Stockholm (SE)

(72) Inventors: Karl-Johan Persson, Stockholm (SE); Fredric Vinnå, Stockholm (SE); Stig Gustav Viktor Söderström, Ekerö (SE); Pär Bohrarper, Göteborg (SE)

(73) Assignee: SPOTIFY AB, Stockholm (SE)

( * ) Notice: Subject to any disclaimer, the term of this patent is extended or adjusted under 35 U.S.C. 154(b) by 83 days.

(21) Appl. No.: 14/714,154

(22) Filed: May 15, 2015

(65) Prior Publication Data
US 2016/0337419 A1    Nov. 17, 2016

(51) Int. Cl.
*G06F 15/16* (2006.01)
*H04L 29/06* (2006.01)
(Continued)

(52) U.S. Cl.
CPC ........ *H04L 65/4069* (2013.01); *G06F 17/212* (2013.01); *H04L 43/0882* (2013.01); *H04L 47/29* (2013.01); *H04L 47/783* (2013.01); *H04L 49/90* (2013.01); *H04L 67/303* (2013.01); *H04N 21/4392* (2013.01); *H04N 21/44004* (2013.01); *H04N 21/4424* (2013.01);
(Continued)

(58) Field of Classification Search
CPC ..................................................... G06F 17/212
USPC ........................................................ 709/219
See application file for complete search history.

(56) References Cited

U.S. PATENT DOCUMENTS 8,792,916 B2 * 7/2014 Dicke .................... G01C 21/32
370/338
8,929,959 B2 * 1/2015 Pamp .................. H04W 76/007
455/522

(Continued)

FOREIGN PATENT DOCUMENTS

EP    2 107 703 A2    10/2009
EP    2 720 436 A1     4/2014

OTHER PUBLICATIONS

He et al., "CBM: Online Strategies on Cost-Aware Buffer Management for Mobile Video Streaming", IEEE Transactions on Multimedia, IEEE Service Center, Piscataway, NJ, US, vol. 16, No. 1., Jan. 1, 2014, pp. 242-252, 12 pages.

(Continued)

*Primary Examiner* — Hamza Algibhah
(74) *Attorney, Agent, or Firm* — Tucker Ellis LLP

(57) ABSTRACT

The present disclosure relates to a method and a media device for pre-buffering media content streamed to the media device from a server system. The media device is connected to a network and has a rechargeable battery. The media device determines, by means of a bandwidth logic, an available network bandwidth and, by means of a charging logic, a charging level of the rechargeable battery. Based on these determinations, i.e. based on the determined available network bandwidth and the determined charging level of the rechargeable battery the media device selects a pre-buffering policy, by means of a pre-buffering logic, and pre-buffers media content, by means of the pre-buffering logic, from the server system in accordance with the selected pre-buffering policy.

20 Claims, 4 Drawing Sheets

(51) Int. Cl.
*H04L 12/861* (2013.01)
*H04L 12/26* (2006.01)
*G06F 17/21* (2006.01)
*H04L 12/801* (2013.01)
*H04L 12/911* (2013.01)
*H04L 29/08* (2006.01)
*H04N 21/44* (2011.01)
*H04N 21/442* (2011.01)
*H04N 21/443* (2011.01)
*H04N 21/439* (2011.01)
*H04N 21/81* (2011.01)

(52) U.S. Cl.
CPC ... *H04N 21/4436* (2013.01); *H04N 21/44209* (2013.01); *H04N 21/44227* (2013.01); *H04N 21/8113* (2013.01)

(56) References Cited

U.S. PATENT DOCUMENTS

| | | | |
|---|---|---|---|
| 8,982,755 B1* | 3/2015 | Shah | H04L 1/1896 370/311 |
| 9,081,745 B2* | 7/2015 | Kyprianou | G06F 15/177 |
| 2002/0099844 A1* | 7/2002 | Baumann | H04L 47/10 709/232 |
| 2005/0071561 A1* | 3/2005 | Olsen | G06F 1/3221 711/118 |
| 2006/0156365 A1 | 7/2006 | Zhang et al. | |
| 2006/0224674 A1 | 10/2006 | Buchheit et al. | |
| 2008/0165701 A1* | 7/2008 | Ananthanarayanan | G06Q 30/06 370/254 |
| 2009/0181650 A1* | 7/2009 | Dicke | G01C 21/32 455/414.1 |
| 2010/0011117 A1 | 1/2010 | Hristodorescu et al. | |
| 2010/0144326 A1* | 6/2010 | Wilhelmsson | H04W 76/007 455/414.1 |
| 2011/0039508 A1* | 2/2011 | Lindahl | G06F 1/3203 455/230 |
| 2011/0087842 A1 | 4/2011 | Lu et al. | |
| 2013/0145138 A1* | 6/2013 | Kyprianou | G06F 15/177 713/1 |
| 2013/0254346 A1* | 9/2013 | McGowan | H04L 65/60 709/219 |
| 2014/0189385 A1* | 7/2014 | Gorbatov | G06F 1/3234 713/320 |
| 2014/0214768 A1* | 7/2014 | Lillibridge | G06F 11/1451 707/645 |
| 2014/0325026 A1* | 10/2014 | Agarwal | H04L 67/04 709/219 |
| 2014/0362118 A1* | 12/2014 | Brydon | G06F 3/1415 345/660 |
| 2014/0368734 A1 | 12/2014 | Hoffert et al. | |
| 2015/0074232 A1* | 3/2015 | Phillips | H04L 65/604 709/219 |
| 2015/0243329 A1* | 8/2015 | Hadorn | H04N 21/44209 386/230 |
| 2015/0271288 A1* | 9/2015 | Burnette | H04L 67/2847 709/203 |

OTHER PUBLICATIONS

Extended European search report, pursuant to Rule 62 EPC, issued by the European Patent Office for EP Application No. 16 16 7144, dated Aug. 3, 2016, 12 pages.
Office Action dated Nov. 21, 2016 issued by United States Patent and Trademark Office for U.S. Appl. No. 14/839,473, 13 pages.
Office Action dated Nov. 23, 2015 issued by United States Patent and Trademark Office on U.S. Appl. No. 14/839,473.
Office Action dated Jun. 7, 2016 issued by United States Patent and Trademark Office on U.S. Appl. No. 14/839,473, 11 pages.
Notice of Allowance dated Jun. 15, 2017 issued by the United States Patent and Trademark Office on U.S. Appl. No. 14/839,473, 5 pages.

* cited by examiner

METHOD AND A MEDIA DEVICE FOR PRE-BUFFERING MEDIA CONTENT STREAMED TO THE MEDIA DEVICE FROM A SERVER SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to providing media, and more particularly to streaming of media. In particular, the embodiments described herein relate to a method and a media device for pre-buffering media content streamed to the media device from a server system.

BACKGROUND

As computer technology has improved, the digital media industry has evolved greatly in recent years. Users are able to use media devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of media devices.

At the same time, advances in network technology have increased the speed and reliability with which information can be transmitted over computers and other networks. It is therefore possible for users to stream media content over different networks as needed, or on demand, rather than receiving a complete file in physical media (such as a CD or a DVD, or downloading the entire file) before consuming the media content.

When streaming media content to a media device it sometimes happens that the streaming is disrupted due to poor network conditions. This causes the streaming of the media content to lag which is very annoying for users who are consuming the media content. Some streaming services therefore continuously pre-buffer a certain amount of data of the media item that is presently streamed. The pre-buffered data may then be played when there is a temporarily disruption in the network service. Thus, by using pre-buffering the user will not experience any lagging or delay in the streamed service.

SUMMARY

It is in view of the above considerations and others that the various embodiments disclosed herein have been made.

It is a general object of the embodiments described herein to allow for an improved way of pre-buffering media content streamed to a media device from a server system. The media device is connected to a network and having a rechargeable battery.

In a first of its aspects, this disclosure concerns a method performed by the media device and comprises determining, by means of a bandwidth logic, an available network bandwidth and, by means of a charging logic, a charging level of the rechargeable battery. A pre-buffering policy is selected, by means of a pre-buffering logic, based on the determined available network bandwidth and the determined charging level of the rechargeable battery. Media content is then pre-buffered, by means of the pre-buffering logic, from the server system in accordance with the selected pre-buffering policy.

In some embodiments, the pre-buffering of media content is performed in accordance with a first policy, in which the pre-buffering is utilizing the full available bandwidth only if the determined charging level is above a predetermined threshold.

According to some embodiments the method further comprises determining, by means of a network logic, the type of network to which the media device is connected and selecting a second pre-buffering policy, in which the pre-buffering is utilizing the full available bandwidth only if the determined network is a local area network. In other embodiments the method further comprises determining, by means of a downloading logic, the amount of media content that has been downloaded during a predetermined previous time period, such as 30 days, and selecting a third pre-buffering policy, in which pre-buffering of media content is prevented if the determined downloaded amount of media content is above a predetermined threshold.

In a second of its aspects, this disclosure concerns a media device for receiving media content from a server system, the media device being connectable to a network. The media device comprises a processor, a rechargeable battery, a bandwidth logic which is adapted to determine an available network bandwidth and a charging logic which is adapted to determine a charging level of the rechargeable battery. The media device further comprises a pre-buffering logic which is adapted to select a pre-buffering policy based on the determined available network bandwidth and the determined charging level of the rechargeable battery. The pre-buffering logic is furthermore adapted to pre-buffer media content from the server system in accordance with the selected pre-buffering policy.

In one embodiment the pre-buffering logic is further adapted to perform pre-buffering of media content in accordance with a first policy, in which the pre-buffering is performed utilizing the full available bandwidth only if the determined charging level is above a predetermined threshold.

In another embodiment the media device further comprises a network logic which is adapted to determine the type of network to which the media device is connected and select a second pre-buffering policy, in which the pre-buffering is utilizing the full available bandwidth only if the determined network is a local area network. The media device may also according to other embodiments comprise a downloading logic which is adapted to determine the amount of media content that has been downloaded during a predetermined previous time period, such as 30 days, and select a third pre-buffering policy, in which pre-buffering of media content is prevented if the determined downloaded amount of media content is above a predetermined threshold.

In a third of it aspects, this disclosure concerns a non-transitory computer readable storage medium, including instructions stored thereon which when read and executed by a media device causes the media device to perform the steps comprising determining, by means of a bandwidth logic, an available network bandwidth and, by means of a charging logic, a charging level of the rechargeable battery. The instructions further cause the media device to perform the step of selecting a pre-buffering policy, by means of a pre-buffering logic, based on the determined available network bandwidth and the determined charging level of the rechargeable battery and pre-buffering media content, by means of the pre-buffering logic, from the server system in accordance with the selected pre-buffering policy.

In some embodiments the instructions stored in the non-transitory computer readable storage medium may further cause the pre-buffering of media content to be performed in accordance with a first policy, in which the pre-buffering is performed utilizing the full available bandwidth only if the determined charging level is above a predetermined threshold.

In other embodiments the instructions stored in the non-transitory computer readable storage medium may cause the media device to perform the step of determining, by means of a network logic, the type of network to which the media device is connected and selecting a second pre-buffering policy, in which the pre-buffering is utilizing the full available bandwidth only if the determined network is a local area network. Furthermore, the instructions may cause the media device to perform the step of determining, by means of a downloading logic, the amount of media content that has been downloaded during a predetermined previous time period, such as 30 days, and selecting a third pre-buffering policy, in which pre-buffering of media content is prevented if the determined downloaded amount of media content is above a predetermined threshold.

Various embodiments described herein allow a user of a media device to pre-buffer streamed media content adapted to prevailing conditions such as the charging state of the rechargeable battery of the media device, the amount of previously downloaded media content and/or the type of available network. Thus, if for example the rechargeable battery is running low the pre-buffering may according to a first policy be halted or paused until the charging level has reached above a predetermined threshold. In this way the battery of the media device will not be further drained due to pre-buffering media content, but instead the power of the battery may be saved for more prioritized tasks of the media device, such as receiving a call or play a song. According to a second policy the pre-buffering of media content may also be halted or paused when the amount of media content that has been downloaded is above a predetermined threshold. This is very beneficial for a user that is on a plan allowing "free" (prepaid) downloading up to a certain amount, such as 10 GB, after which the user has to start paying. The type of network may also affect which policy to use when pre-buffering media content. According to a third policy pre-buffering is performed utilizing the full available bandwidth only if the network is a local area network, such as Wi-Fi or Ethernet. If the network is a cellular network pre-buffering may instead be halted or the bit-rate of the pre-buffering may be reduced. This is very beneficial for a user since cellular networks usually have a high cost for downloading data compared to local area networks which very often are free to use.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for pre-buffering media content may be inadequate. It is therefore a general object of the embodiments described herein to allow for an improved pre-buffering of streamed media items.

To address this, in accordance with different embodiments, described herein are a method and a media device for pre-buffering media content streamed to the media device from a server system. While a media stream is being played an available bandwidth and a charging level of a rechargeable battery of the media device is determined. Furthermore, based on the available bandwidth and the charging level of the rechargeable battery, a pre-buffering policy is selected. This selected pre-buffering policy is then used for pre-buffering media content from the server system to the media device.

This way, it is made possible to enable a user of the media device to adapt a pre-buffering policy or strategy to the prevailing conditions such as the charging state of the rechargeable battery of the media device, the amount of previously downloaded media content and/or the type of available network.

Figure 1:
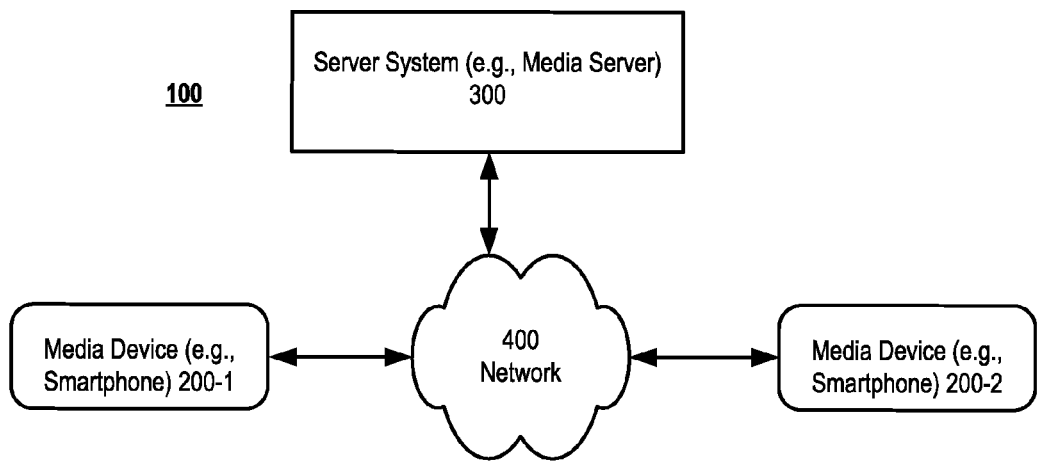
FIG. 1 is a block diagram schematically illustrating an exemplary media content delivery system in accordance with some embodiments.

FIG. 1 is a block diagram illustrating an exemplary media content delivery system 100 in accordance with some embodiments. The media content delivery system 100 may comprise one or several media devices 200 (e.g., media device 200-1 and media device 200-2) and one server system 300 that may comprise one or more servers (e.g., media content servers also known as media servers).

In some embodiments, the media device 200 may be a mobile telephone, such as a smart phone. Alternatively, the media device 200 may be a tablet computer. In yet other embodiments, the media device 200 may be any other media device capable of playback of media content such as, for example, one of the media devices of the following group: a laptop, and a mobile media device (e.g. a handheld entertainment device, or a digital media player).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include local area networks (LAN), such as WiFi or Ethernet, or cellular networks.

Figure 2:
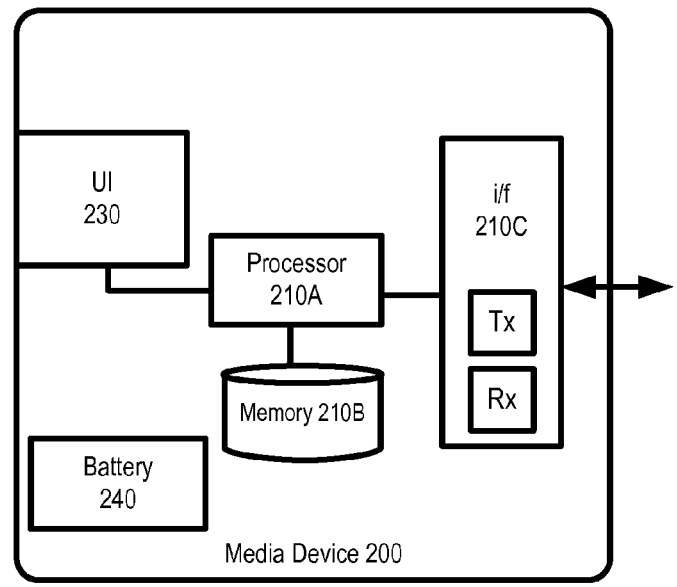
FIG. 2 illustrates an example implementation of an embodiment of a media device.

With reference to FIG. 2, an example implementation of the media device 200 of FIG. 1 will be described in some further detail. For example, the media device 200 may be implemented as a portable electronic device, such as a smart phone, a mobile telephone, a cellular telephone, a tablet computer, a laptop computer, or a personal digital assistant.

In some embodiments, the media device 200 may comprise means adapted to perform the method described below with reference to FIG. 4. In one embodiment, the media device 200 thus comprises means adapted to determine an available network bandwidth, as well as means adapted to determine a charging level of the rechargeable battery of the media device 200.

In some embodiments, the media device 200 may further comprise means adapted to select a pre-buffering policy based on the determined network bandwidth and the determined charging level of the rechargeable battery.

In some embodiments, the media device 200 may further comprise means adapted to pre-buffer media content from the server system 300 to the media device 200.

With continued reference to FIG. 2, an example implementation of the media device 200 will now be described. The media device 200 is configured to execute, or otherwise perform, any of the methods described herein below with reference to FIG. 4. As is schematically illustrated in FIG. 2, the media device 200 comprises hardware 210A-C, a user interface (UI) 230 and a rechargeable battery 240. For example, the media device 200 may comprise one or more processors 210A and one or more memories 210B. Also, a communications interface 210C may be provided in order to allow the media device 200 to communicate with other media devices and/or server systems 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the media device 200 to communicate with other devices and/or server systems 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The media device 200 may further comprise a user interface 230, which may be comprised of a display and a keypad. Advantageously, the user interface 230 includes a touch-sensitive display to be described below in conjunction with FIG. 3. As such, the touch-sensitive display may be a touch screen display upon which virtual keys may be displayed and operated. As will be described with reference to FIG. 3, the media device 200 may also comprise one or more applications, e.g. a media playback application 220. These applications may include sets of instructions (e.g., computer program code) that when executed by the one or more processors 210A control the operation of the media device 200.

In some implementations, the one or more memories 210B stores computer program code, which, when run in the one or more processors 210A causes the media device 200 to perform the method that will be described in conjunction with FIG. 4.

Figure 3:
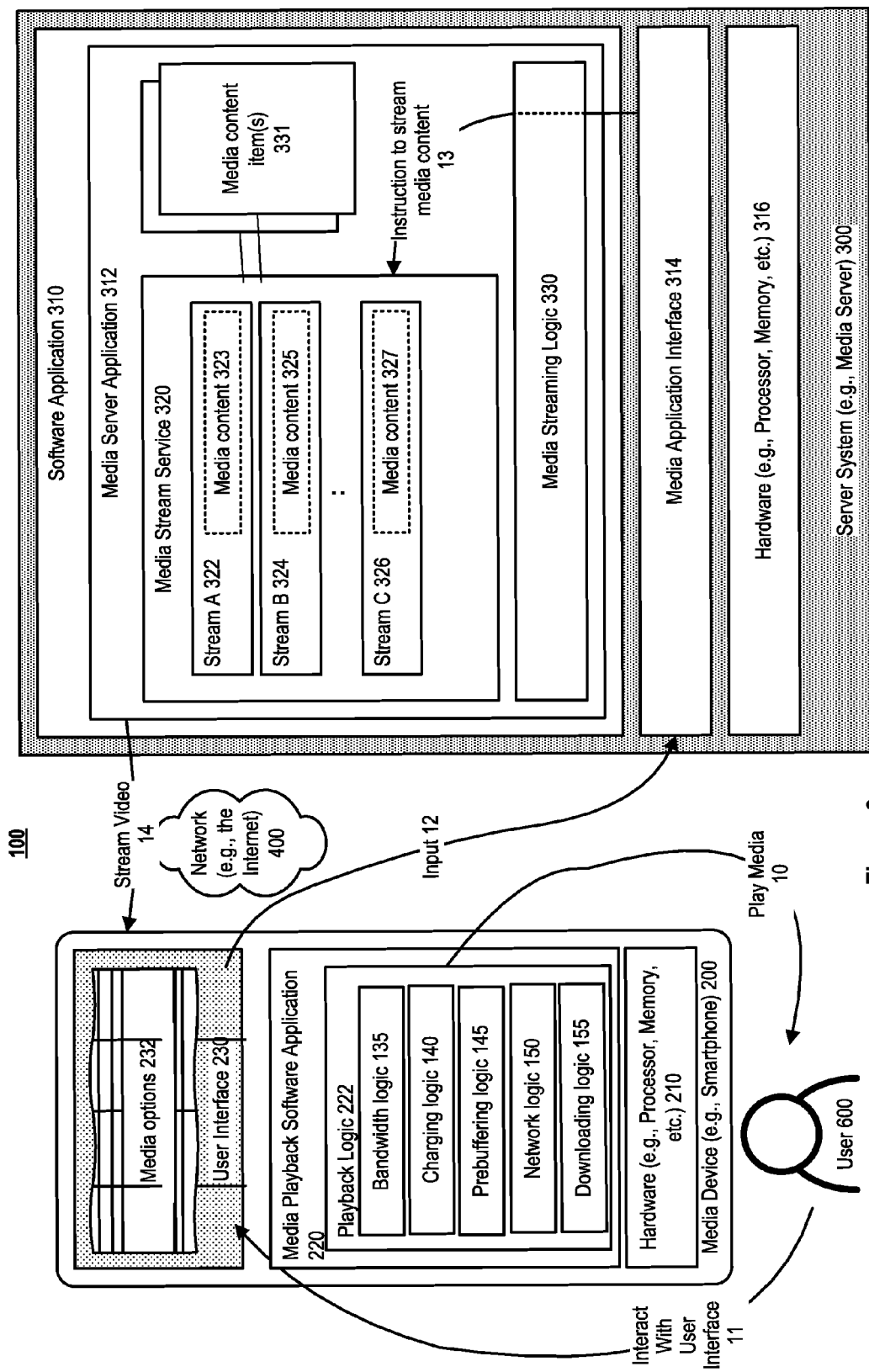
FIG. 3 illustrates an example embodiment of a system for playback of media streams, in accordance with an embodiment.

Turning now to FIG. 3, an example environment where embodiments of this disclosure may be applied will be described. A media device 200, e.g. the media device 200-1 of FIG. 1, may be communicatively connectable to the server system 300 via the network 400, e.g. the Internet, as described hereinabove. As can be seen in FIG. 3, only a single media device 200 and a single server system 300 are shown. However, the server system 300 may support the simultaneous use of multiple media devices, and/or the media device 200 can simultaneously access media content at multiple server systems 300. Although FIG. 3 illustrates the server system 300 in accordance with one example embodiment, FIG. 3 is intended more as a functional description of the various features, or components, which may be present in one or more server systems, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media content will in general be exemplified to be audio content, e.g. in form of music. This should, however, not be interpreted as limiting the scope of the various embodiments of the disclosed embodiments. As is understood by a person skilled in the art media content may also be video content etc.

As is schematically shown in FIG. 3, the media device 200 may be used for the playback of media content (e.g., audio content such as music), which is provided by the server system 300. The media device 200 may include one or several physical computer resources, or hardware resources 210. The hardware resources 210 may e.g. include one or several processors (or, processing circuitry), a communications interface (or, communication circuitry) and one or several memories. Likewise, the server system 300 operating as a media server may include one or several physical computer resources, or hardware resources 316. The hardware resources 316 may likewise include one or several processors (or, processing circuitry), a communications interface (or, communication circuitry) and one or several memories.

The server system 300 may include an operating system or other processing system which supports execution of a software application 310, including a media server application 312 which may be used, for example, to stream media content. A media stream service 320 may be used to buffer media content, for streaming to one or more media streams 322, 324, and 326. A media application interface 314 may receive requests from media devices 200 or other systems, to retrieve media content 331 from the server system 300.

Media content 331, or media items, may be provided, for example, within a first storage such as a memory (e.g., including a database), or may be received by the server system 300 from another source (not shown). This other source (not shown) could be external to the server system 300, i.e. it may be located remotely from the server system 300.

A media streaming logic 330 may be used to retrieve or otherwise access the media content 331 in response to requests from media devices 200 or other systems, and populate the media stream service with streams 322, 324, 326 of corresponding media content data 323, 325, 327 that may be returned, i.e. streamed, to the requesting media device 200.

The media device 200 comprises a user interface 230, which is adapted to display or otherwise provide a visual array of media options 232, for example a two-dimensional grid, a list, or other visual array format, and determine a user input. Each media option in the visual array of media options 232 correspond to a respective media stream 322, 324, 326.

Selecting a particular media option within the visual array 232 may in some embodiments be used, or otherwise interpreted, as a request or instruction to the media server application 312 to stream or otherwise return a corresponding particular media content item. For example, in accordance with some embodiments, the software application 310 at the server system 300 may be used to stream or otherwise communicate media content to the media device 200, wherein the user interface 230 at the media device 200 is adapted to display a plurality of media options that correspond to respective media streams.

In accordance with some embodiments, the media device 200 may also include a media playback application 220, together with a playback logic 222, a bandwidth logic 135, a charging logic 140, a pre-buffering logic 145, a network logic 150 and a downloading logic 155, which all may be used to control the playback of media content that is received from the media server application 312, for playback by the media device 200, and select a proper pre-buffering policy, as described in further detail below.

A user 600 may interact 11 with the user interface 230 and issue requests, for example playing a selected media option at the media device 200. The user's selection of a particular media option may be communicated 12 to the media server application 312, via the media application interface 314. The media server application 312 may then be instructed 13 to stream corresponding media content 13, including one or more streams of media content data 323, 325, 327, and subsequently stream 14 or otherwise communicate the selected media to the user's media device 200. In accordance with some embodiments, pre-buffering requests from the media device 200 may also be communicated 12 to the media server application 312 via the media application interface 314. The generation of pre-buffering requests, i.e. the type of pre-buffering policy, from the pre-buffering logic 145 is based on available bandwidth, as determined by the bandwidth logic 135, and on the charging level of the rechargeable battery of the media device 200, as determined by the charging logic 140. In some embodiments the type-of pre-buffering policy may furthermore be selected based on the type of network to which the media device 200 is connected, as determined by the network logic 150. In other embodiments the pre-buffering policy may also take into account the amount of media content that has been downloaded during a predetermined previous time period, such as 30 days. The previously downloaded amount of media content is determined by the downloading logic 155. At the media device 200, in response to the user's interaction with the user interface 230, the media playback application 220, including the playback logic 222, may play 10 the requested media content to the user 600 together with a selected pre-buffering policy.

Figure 4:
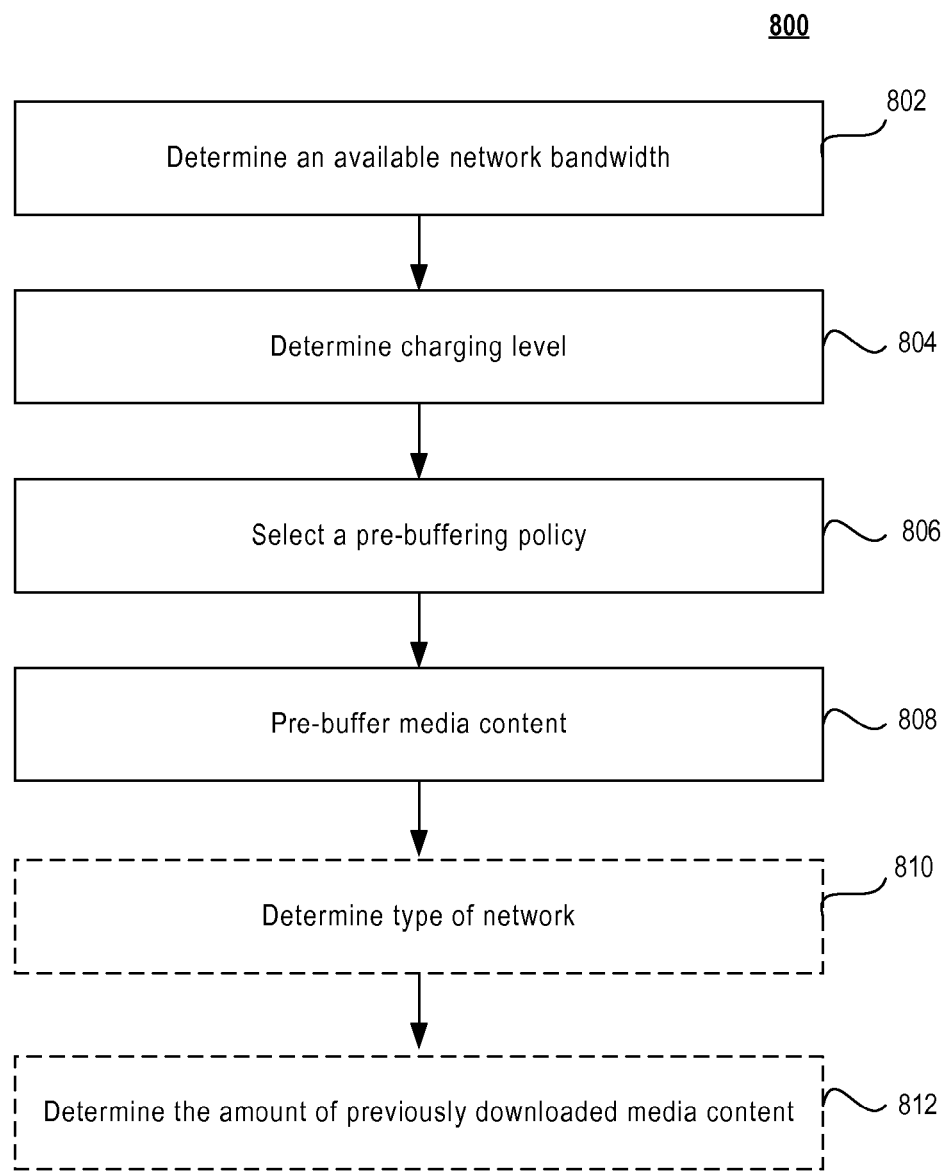
FIG. 4 schematically illustrates a flowchart of a method in accordance with an embodiment.

With reference to FIG. 4, an embodiment of a method 800 performed by a media device for pre-buffering media content to the media device from the server system will now be described. The media device is connected to a network and has as mentioned above a rechargeable battery. The method for pre-buffering media content may be performed while an audio stream is being played (e.g., at a user interface of the media device), but this is not necessary. Pre-buffering may also be performed when not streaming media content as long as the media playback application is running on the media device.

Thus, when the media playback application is running the media device 200 determines 802, by means of the bandwidth logic 135, the available network bandwidth that is available for the media device 200. Depending on the available network bandwidth different pre-buffering policies or strategies may be chosen. If the bandwidth for the media device 200 is limited a more restrictive pre-buffering policy is probably wanted. Thus, if the resources are scarce streaming (if in streaming mode) will be prioritized over pre-buffering. However, according to some embodiments it is not only the available network bandwidth that determines the pre-buffering strategy. Accordingly the media device 200 also determines 804, by means of the charging logic 140, the charging level of the rechargeable battery of the media device. Also here the pre-buffering policy will be adapted to the prevailing conditions, in this case the charging level of the media device 200. If the rechargeable battery is low it will according to some policies be important to only perform the most basic functions of the media device, and in such a case the pre-buffering will be prevented. With other words, if the charging level is determined to be above a predetermined threshold, the media device 200 will according to a first pre-buffering policy utilize the full available network bandwidth.

Depending on the determination of the available network bandwidth and the charging level of the rechargeable battery, the media device 200 selects 806, by means of the pre-buffering logic 145, a pre-buffering policy. Thus the selection of pre-buffering policy is based on the determined available network bandwidth and the determined charging level of the rechargeable battery. After the selection of pre-buffering policy the media device 200 starts pre-buffering 808 media content, by means of the pre-buffering logic 145.

In some embodiments the method may as an optional step further comprise determining 810, by means of the network logic 150, the type of network to which the media device is connected to. This may be an important feature depending on downloading costs in different types of networks. Typically the cost for downloading data, i.e. media content, is much higher or more restricted in a cellular network then in a local area network, such as WiFi or Ethernet. Accordingly based on the determination of which network the media device is connected to the pre-buffering policy is adapted. In some cases no pre-buffering is performed if the media device is connected to a cellular network. A second pre-buffering policy may be determined, in which the pre-buffering is utilizing the full available network bandwidth if the determined network is a local area network.

In yet some other embodiments the method may as a further optional step comprise determining 812, by means of the downloading logic 155, the amount of media content that has been downloaded during a predetermined previous time period, such as 30 days. This is an important feature if the user for example has a flat rate for downloading a certain amount of data, for example 2 GB during 30 days or a month. If this limit is reached it might be very expensive or slow to continue downloading data. Thus according to a third pre-buffering policy, which the media device selects, the pre-buffering of media content is prevented if the determined downloaded amount of media content is above a predetermined threshold. As is understood by a person skilled in the art the previous time period may be freely chosen and is not limited to 30 days or a month.

Figure 5:
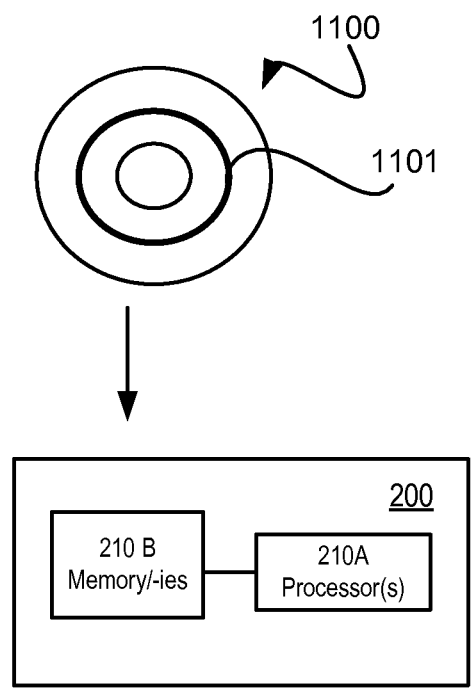
FIG. 5 illustrates a carrier comprising a computer program, in accordance with an embodiment.

Turning now to FIG. 5, still another embodiment will be briefly discussed. FIG. 5 shows an example of a computer-readable medium, in this example in the form of a data disc 1100. In one embodiment the data disc 1100 is a magnetic data storage disc. The data disc 1100 is configured to carry instructions 1101 that can be loaded into a memory 210B of a media device 200. Upon execution of said instructions by a processor 210A of the media device 200, the media device 200 is caused to execute a method or procedure according to any one of the embodiments described in conjunction with FIG. 4. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as a media device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the media device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method performed by a media device for pre-buffering media content streamed to the media device from a server system, the media device being connected to a network and having a rechargeable battery, said method comprising:

providing, at the media device, a media playback application which controls the playback of media content that is received from the server system, for playback by the media device;

providing, at the media device, a user interface adapted to display a plurality of media options corresponding to respective media streams;

determining, by a bandwidth logic within the media playback application, an available network bandwidth;

determining, by a charging logic within the media playback application, a charging level of the rechargeable battery;

receiving, at the user interface, a selection of a particular media option of the plurality of media options;

interpreting the selection of the particular media option as a request to the server system to stream a corresponding particular media content item;

selecting a pre-buffering policy for the particular media content item, by a pre-buffering logic within the media playback application, based on the determined available network bandwidth and the determined charging level of the rechargeable battery, including
   determining an amount of media content data of the particular media content item to be pre-buffered;
   generating a pre-buffering request, for transmission to the server system, based on the determined available network bandwidth and the determined charging level, wherein the pre-buffering request includes an amount of bandwidth to utilize for the pre-buffering, and the determined amount of media content data to be pre-buffered; and
   pre-buffering media content data of the particular media content item from the server system, by the media playback application, in the amount determined by the pre-buffering logic, in accordance with the selected pre-buffering policy.

2. The method according to claim 1, wherein the pre-buffering of media content is performed in accordance with a first pre-buffering policy, in which the pre-buffering is utilizing the full available bandwidth only if the determined charging level is above a charging level threshold.

3. The method according to claim 1, further comprising: determining, by a network logic within the media playback application, the type of network to which the media device is connected and selecting a second pre-buffering policy, in which the pre-buffering is utilizing the full available bandwidth only if the determined network is a local area network.

4. The method according to claim 1, further comprising: determining, by a downloading logic within the media playback application, the amount of media content that has been downloaded during a predetermined previous time period, and selecting a third pre-buffering policy, in which pre-buffering of media content is prevented if the determined downloaded amount of media content is above a predetermined threshold.

5. The method according to claim 2, wherein in accordance with the first pre-buffering policy, pre-buffering is paused until the determined charging level is above the charging level threshold.

6. The method according to claim 3, wherein in accordance with the second pre-buffering policy, pre-buffering is paused if the determined network is a cellular network.

7. The method according to claim 3, wherein in accordance with the second pre-buffering policy, a bit-rate of the pre-buffering is reduced if the determined network is a cellular network.

8. The method according to claim 1, wherein the pre-buffering of media content is performed while an audio stream is being played.

9. A media device for receiving media content from a server system, the media device being connectable to a network, said media device comprising:
   a processor;
   a rechargeable battery;
   a media playback application which is adapted to control playback of media content received from the server system, for playback by the media device;
   a user interface which is adapted to display a plurality of media options corresponding to respective media streams, and to receive a selection of a particular media option of the plurality of media options, wherein the processor is configured to cause the media device to interpret the selection of the particular media option as a request to the server system to stream a corresponding particular media content item;
   a bandwidth logic within the media playback application, which is adapted to determine an available network bandwidth;
   a charging logic within the media playback application, which is adapted to determine a charging level of the rechargeable battery; and
   a pre-buffering logic within the media playback application, which is adapted to select a pre-buffering policy based on the determined available network bandwidth and the determined charging level of the rechargeable battery, including
      determining an amount of media content data of the particular media content item to be pre-buffered, and
      generating a pre-buffering request, for transmission to the server system, based on the determined available network bandwidth and the determined charging level,
         wherein the pre-buffering request includes an amount of bandwidth to utilize for the pre-buffering, and the determined amount of media content data to be pre-buffered, and
      wherein the media playback application is further adapted to pre-buffer media content data of the particular media content item from the server system in the amount determined by the pre-buffering logic, in accordance with the selected pre-buffering policy.

10. The media device according to claim 9, wherein the pre-buffering logic is further adapted to perform pre-buffering of media content in accordance with a first pre-buffering policy, in which the pre-buffering is performed utilizing the full available bandwidth only if the determined charging level is above a predetermined charging level threshold.

11. The media device according to claim 9, further comprising:
   a network logic within the media playback application, which is adapted to determine the type of network to which the media device is connected and select a second pre-buffering policy, in which the pre-buffering is utilizing the full available bandwidth only if the determined network is a local area network.

12. The media device according to claim 9, further comprising:
   a downloading logic within the media playback application, which is adapted to determine the amount of media content that has been downloaded during a predetermined previous time period, and select a third pre-buffering policy, in which pre-buffering of media content is prevented if the determined downloaded amount of media content is above a predetermined threshold.

13. The media device according to claim 10, wherein in accordance with the first pre-buffering policy, pre-buffering is paused until the determined charging level is above the charging level threshold.

14. The media device according to claim 11, wherein in accordance with the second pre-buffering policy, pre-buffering is paused if the determined network is a cellular network.

15. The media device according to claim 11, wherein the pre-buffering of media content is performed while an audio stream is being played.

16. The media device according to claim 9, wherein the pre-buffering of media content is performed while an audio stream is being played.

17. A non-transitory computer readable storage medium, including instructions stored thereon which when read and executed by a media device cause the media device to perform the steps comprising:

provide, at the media device, a media playback application which controls the playback of media content that is received from a server system, for playback by the media device;

providing, at the media device, a user interface adapted to display a plurality of media options corresponding to respective media streams;

determining, by a bandwidth logic within the media playback application, an available network bandwidth;

determining, by a charging logic within the media playback application, a charging level of the rechargeable battery;

receiving, at the user interface, a selection of a particular media option of the plurality of media options;

interpreting the selection of the particular media option as a request to the server system to stream a corresponding particular media content item;

selecting a pre-buffering policy for the particular media content item, by a pre-buffering logic within the media playback application, based on the determined available network bandwidth and the determined charging level of the rechargeable battery, including
determining an amount of media content data of the particular media content item to be pre-buffered;

generating a pre-buffering request, for transmission to the server system, based on the determined available network bandwidth and the determined charging level, wherein the pre-buffering request includes an amount of bandwidth to utilize for the pre-buffering, and the determined amount of media content data to be pre-buffered; and pre-buffering media content data of the particular media content item from the server system, by the media playback application, in the amount determined by the pre-buffering logic, in accordance with the selected pre-buffering policy.

18. The non-transitory computer readable storage medium of claim 17, wherein the pre-buffering of media content is performed in accordance with a first pre-buffering policy, in which the pre-buffering is performed utilizing the full available bandwidth only if the determined charging level is above a charging level threshold.

19. The non-transitory computer readable storage medium of claim 17, further causing the media device to perform the step of:

determining, by a network logic within the media playback application, the type of network to which the media device is connected and selecting a second pre-buffering policy, in which the pre-buffering is utilizing the full available bandwidth only if the determined network is a local area network.

20. The non-transitory computer readable storage medium of claim 17, further causing the media device to perform the step of:

determining, by a downloading logic within the media playback application, the amount of media content that has been downloaded during a predetermined previous time period, and selecting a third pre-buffering policy, in which pre-buffering of media content is prevented if the determined downloaded amount of media content is above a predetermined threshold.

* * * * *